(12) United States Patent
Varipatis et al.

(10) Patent No.: US 10,193,111 B2
(45) Date of Patent: Jan. 29, 2019

(54) CONVERTIBLE BATTERY PACK

(71) Applicant: Black & Decker Inc., New Britain, CT (US)

(72) Inventors: Michael Varipatis, Fallston, MD (US); Nathan J. Osborne, Baltimore, MD (US); Ryan Klee, Baltimore, MD (US); Brian E. Friedman, Baltimore, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 15/627,981

(22) Filed: Jun. 20, 2017

(65) Prior Publication Data

US 2017/0338452 A1    Nov. 23, 2017

Related U.S. Application Data

(63) Continuation-in-part of application No. 15/160,485, filed on May 20, 2016.

(60) Provisional application No. 62/352,172, filed on Jun. 20, 2016.

(51) Int. Cl.
| | |
|---|---|
| *H02K 23/64* | (2006.01) |
| *H01M 2/10* | (2006.01) |
| *H01M 2/20* | (2006.01) |
| *H01M 10/42* | (2006.01) |
| *H01M 2/34* | (2006.01) |
| *H02J 7/00* | (2006.01) |
| *H02J 7/02* | (2016.01) |
| *H01M 2/30* | (2006.01) |
| *H02J 7/04* | (2006.01) |
| *H02P 25/14* | (2006.01) |

(52) U.S. Cl.
CPC ....... *H01M 2/1022* (2013.01); *H01M 2/1061* (2013.01); *H01M 2/204* (2013.01); *H01M 2/30* (2013.01); *H01M 2/34* (2013.01); *H01M 10/425* (2013.01); *H01M 10/4207* (2013.01); *H02J 7/0014* (2013.01); *H02J 7/0024* (2013.01); *H02J 7/0044* (2013.01); *H02J 7/0045* (2013.01); *H02J 7/02* (2013.01); *H02J 7/022* (2013.01); *H02J 7/045* (2013.01); *H02P 25/14* (2013.01); *H01M 2220/30* (2013.01)

(58) Field of Classification Search
CPC .. H01M 10/4257; H01M 2/204; H02J 7/0045; H02J 7/02

See application file for complete search history.

(56) References Cited

U.S. PATENT DOCUMENTS

2004/0009702 A1*   1/2004   Potega ................... H01R 24/58
                                                                    439/578

\* cited by examiner

*Primary Examiner* — Karen Masih
(74) *Attorney, Agent, or Firm* — Michael Aronoff

(57) ABSTRACT

The present disclosure is directed to a convertible battery pack having an improved switching circuit. The switching circuit includes a converter element having a plurality of contacts positioned in the converter element such that as the converter element slides within the battery pack the contacts move from a first position to engage a first set of contact pads to a second position to engage a second set of contact pads. The converter element includes a pair of springs for each of the plurality of contacts that force the contacts into engagement with the contact pads but also allow the contacts to adjust for imperfections in the contact pad surface or the manufacturing tolerances of the contact pads or a support board that holds the contact pads.

4 Claims, 17 Drawing Sheets

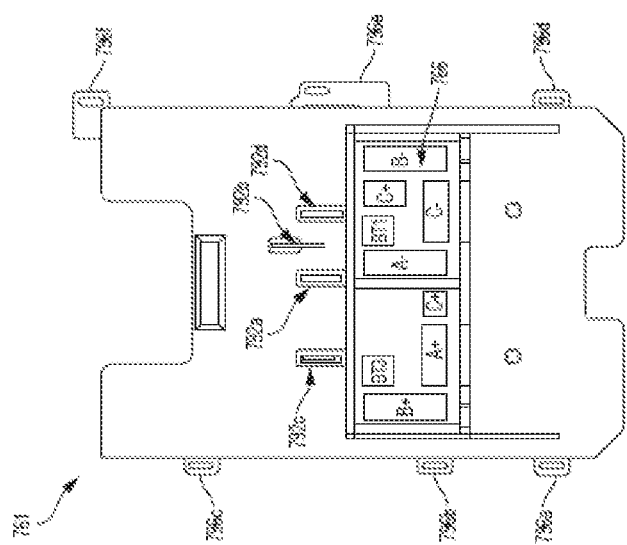

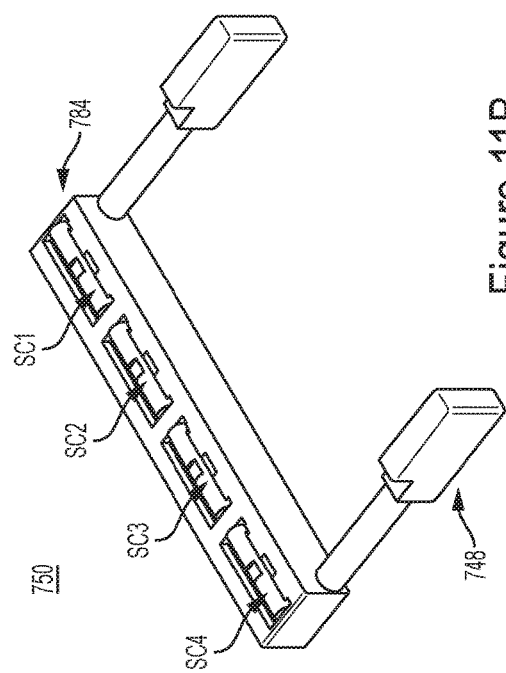
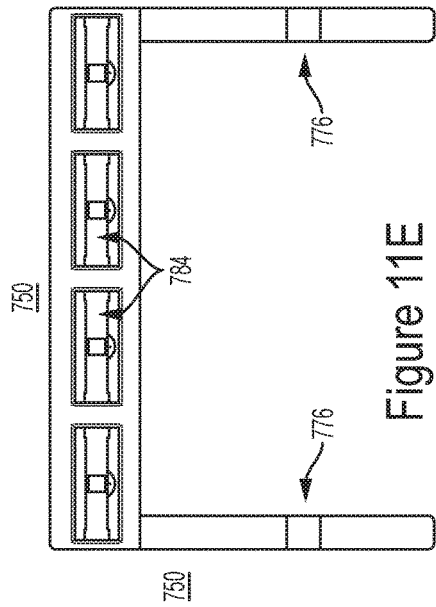
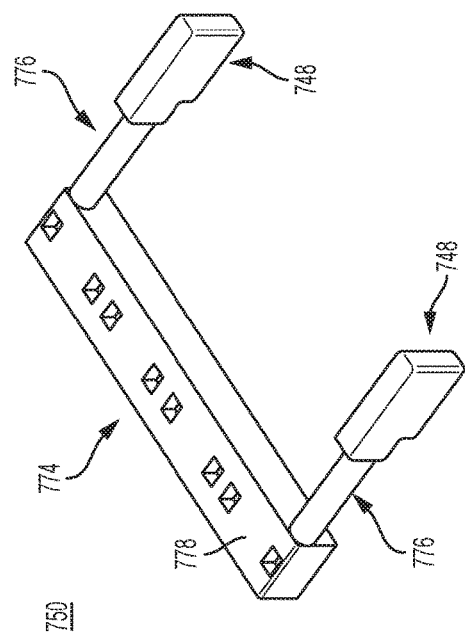
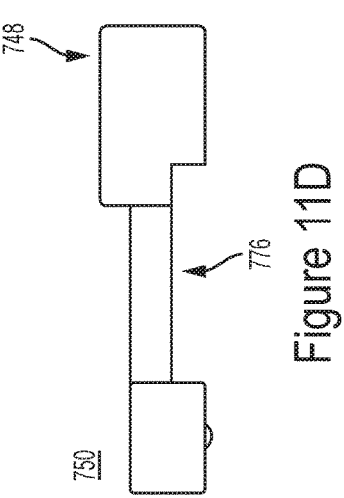
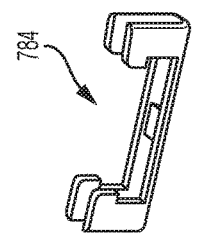

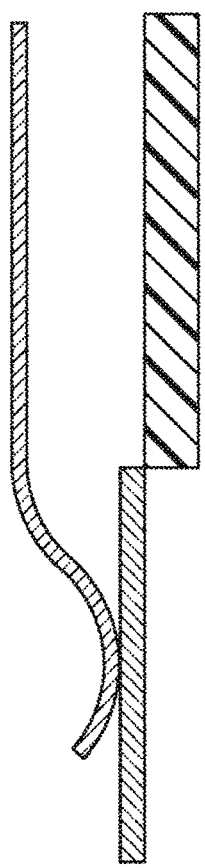

CONVERTIBLE BATTERY PACK

RELATED APPLICATIONS

This application claims priority under 35 U.S.C. § 119(e) to U.S. Provisional Patent Application No. 62/352,172, filed Jun. 20, 2016, titled "Convertible Battery Pack" and to U.S. Non-Provisional Patent Application No. 15/160,485, filed May 20, 2016, titled "Power Tool System," each of which are incorporated by reference.

TECHNICAL FIELD

This application relates to a convertible battery pack and a method for manufacturing a convertible battery pack. In one implementation, the battery pack is configured to convert a connection between two sets of battery cells from a series connection to a parallel connection.

BACKGROUND

Various types of electric power tools are commonly used in construction, home improvement, outdoor, and do-it-yourself projects. Conventional power tools generally fall into two categories—AC power tools (often also called corded power tools) that are powered by an AC power source, e.g., an AC mains line or a generator, and DC power tools (often also called cordless power tools) that are powered by one or more DC power sources, e.g., a removable and rechargeable battery pack.

Corded power tools generally are used for heavy duty applications that require high power and/or long runtimes, such as heavy duty sawing, heavy duty drilling and hammering, and heavy duty metal working. However, as their name implies, corded power tools require the use of a cord that can be connected to an AC power source. In many applications, such as on construction sites, it is not convenient or practical to find a continuously available AC power source and/or AC power must be generated by a portable power supply such as a generator, e.g. gas powered generator.

Cordless power tools generally are used for lighter duty applications that require low or medium power and/or short runtimes, such as light duty sawing, light duty drilling, and fastening. As cordless tools tend to be more limited in their power and/or runtime, they have not generally been accepted by the industry for all applications. They are also limited by weight since the higher capacity batteries tend to have greater weight, creating an ergonomic disadvantage.

Generally, conventional power tool battery packs may not be able to run conventional corded power tools or other corded electrical devices, while untransformed AC power may not be able to be used to run cordless power tools. Further, the battery packs for cordless power tools may require frequent recharging, may be expensive to purchase, and may be cumbersome to manage on a large construction site.

SUMMARY

The present invention is directed to improvements in convertible battery packs for cordless electrical devices. One example of a cordless electrical device is a cordless power tool, such as a drill or a circular saw. The convertible battery packs may be used with other types of electrical devices, such as lights, radios, generators and appliances.

A convertible battery pack is a battery pack that is capable of providing multiple output voltages and includes an internal switching circuit that couples the battery cells in a series configuration or a parallel configuration. The switching circuit may include mechanical elements and/or electrical elements. A battery pack including mechanical elements must insure that the mechanical elements operate consistently over the life of the battery pack and perform the switching function reliably.

In addition, as the convertible battery pack may include many complex features, improvements to the manufacturing process to achieve lower costs is always a benefit.

An aspect of the present invention includes an improved switching circuit. The improved switching circuit includes improves electrical contacts to more consistently and accurately perform the switching function. An exemplary embodiment of the battery pack comprises a plurality contact pads positioned in a plane, a converting element having sliding housing that is configured to move in a direction parallel to the plane, at least one contact housed in the sliding housing extending from the housing towards the plane, at least one spring forcing the at least one contact into engagement with the plane.

A first embodiment of a battery pack comprising a support board having a planar surface; a plurality of contact pads arranged in a predefined configuration in the support board, each of the plurality of contact pads having an exposed planar surface generally parallel to the support board planar surface; and a converter element including a housing having a first side facing the support board planar surface, at least one contact held in the housing, the at least one contact having a mating surface and extending towards the support board planar surface, and at least one spring held in the housing positioned between the housing and the at least one contact forcing the at least one contact towards the planar surface and the plurality of contact pads.

These and other advantages and features will be apparent from the description and the drawings.

BRIEF DESCRIPTION OF THE DRAWINGS

FIG. 10 is a plan view of the support board of the converting subsystem of FIG. 7.

FIGS. 11A, 11B, 11C, 11D, and 11E are views of the converter element and switching contact of the converter element of FIG. 9.

FIG. 12 is an elevation view of a conventional spring contact and a contact pad.

DETAILED DESCRIPTION

Figure 1:
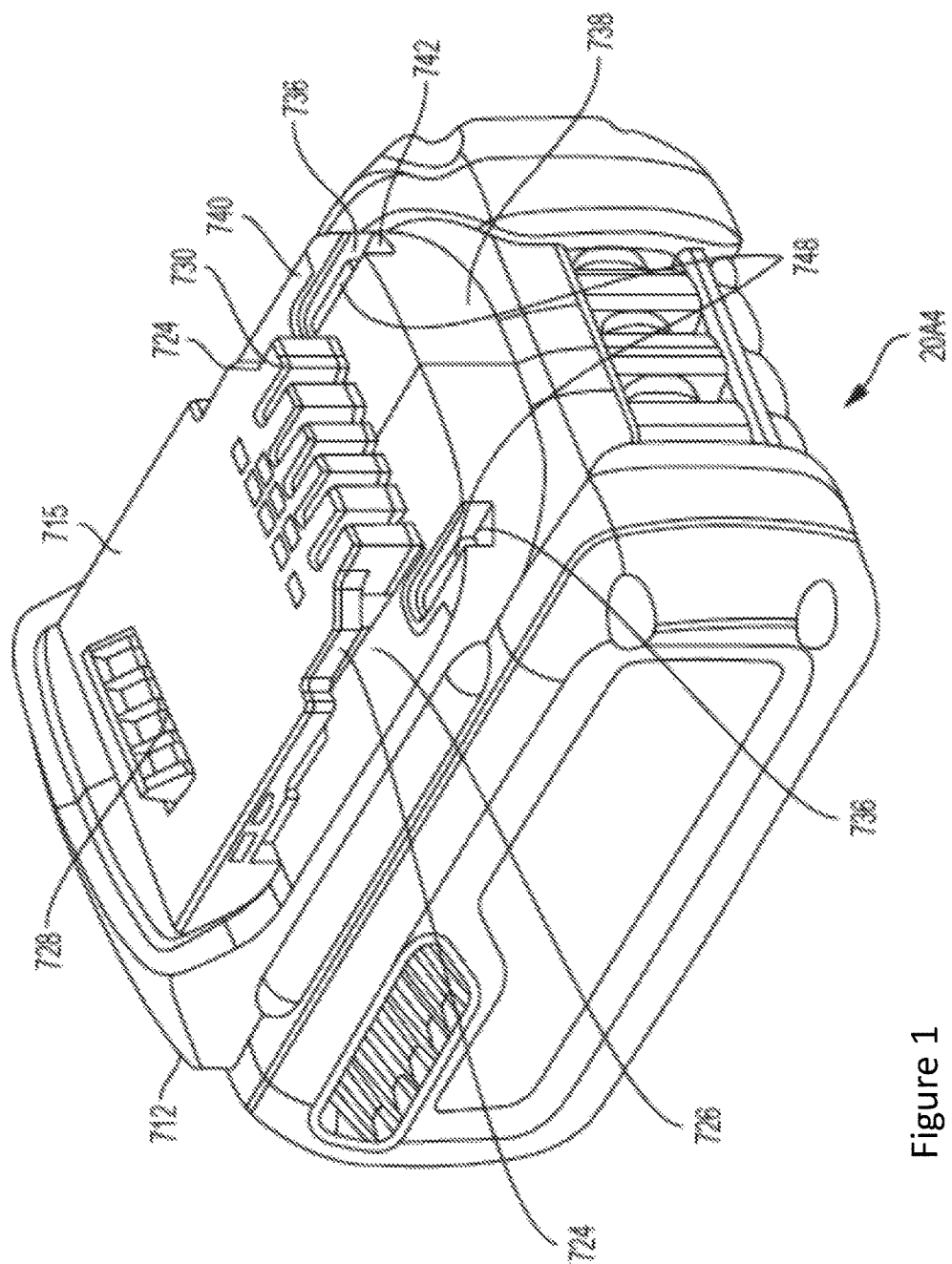
FIG. 1 is a perspective view of an exemplary embodiment a convertible battery pack.
Figures 2A, 2B:
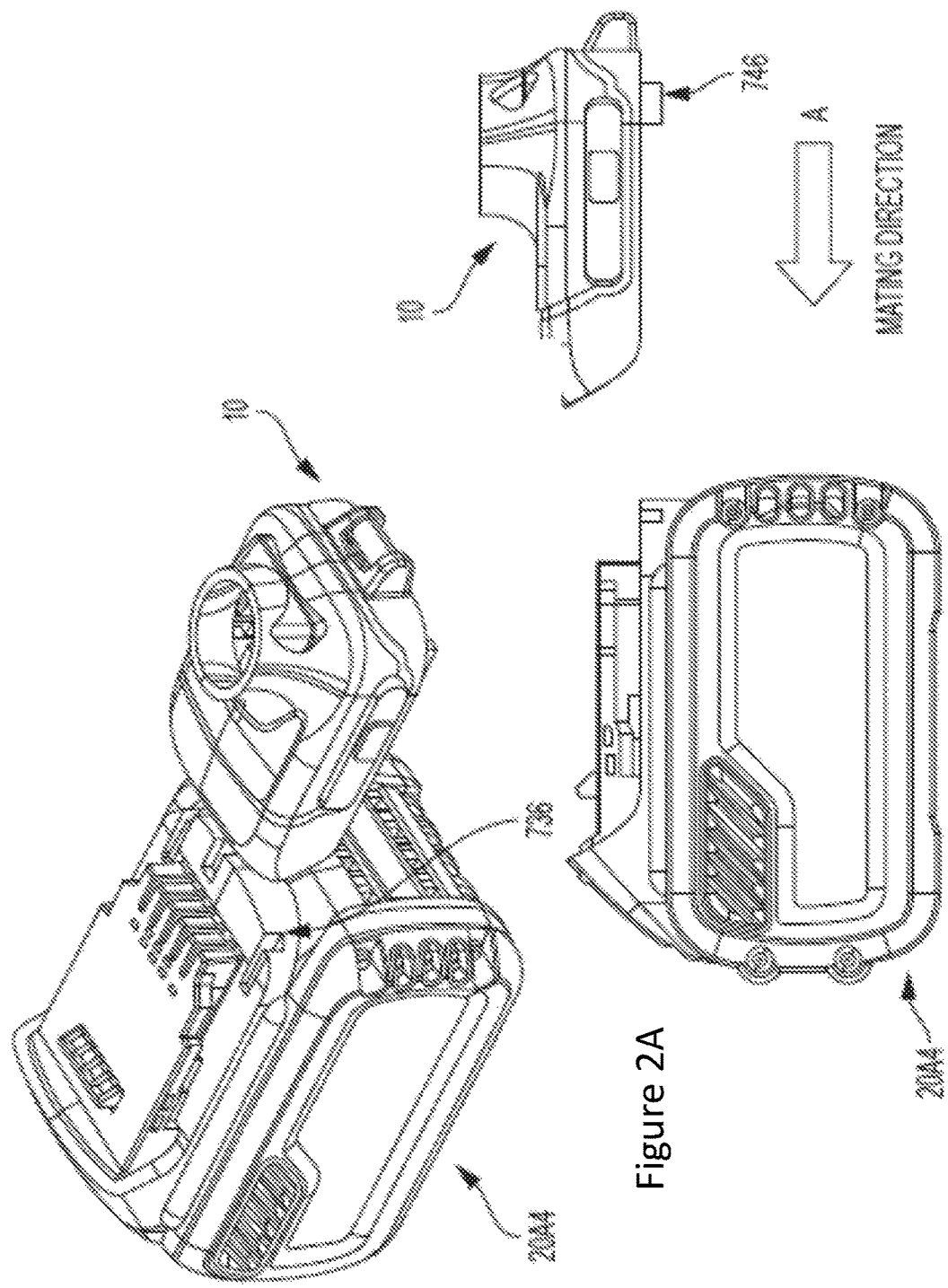
FIGS. 2A and 2B are views of the exemplary battery pack of FIG. 1 and a tool foot of an exemplary medium rated voltage power tool.
Figure 3:
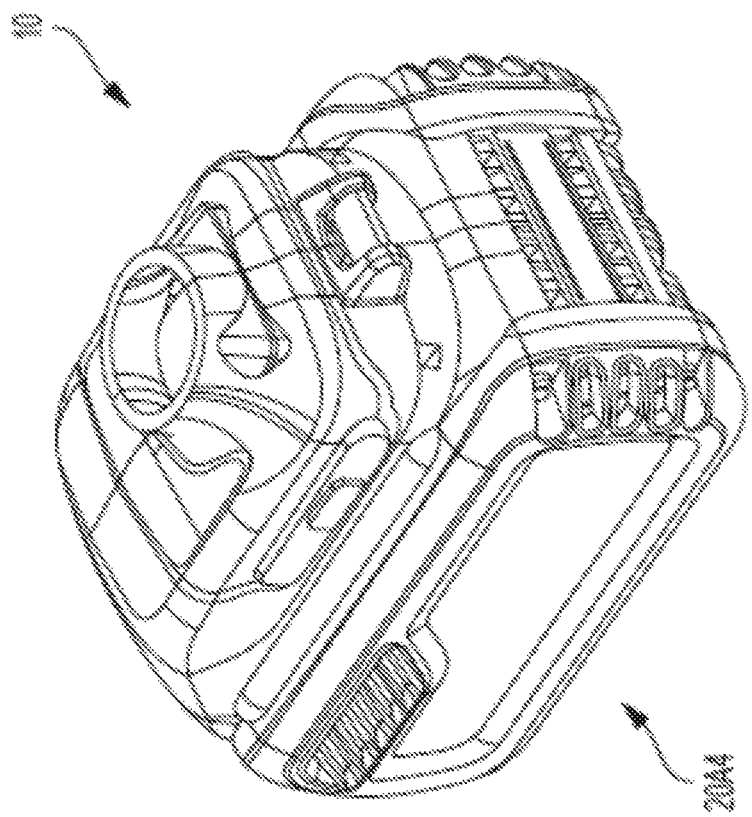
FIG. 3 is a view of the exemplary battery pack and the tool foot of FIGS. 2A and 2B in a mated position.
Figure 4A:
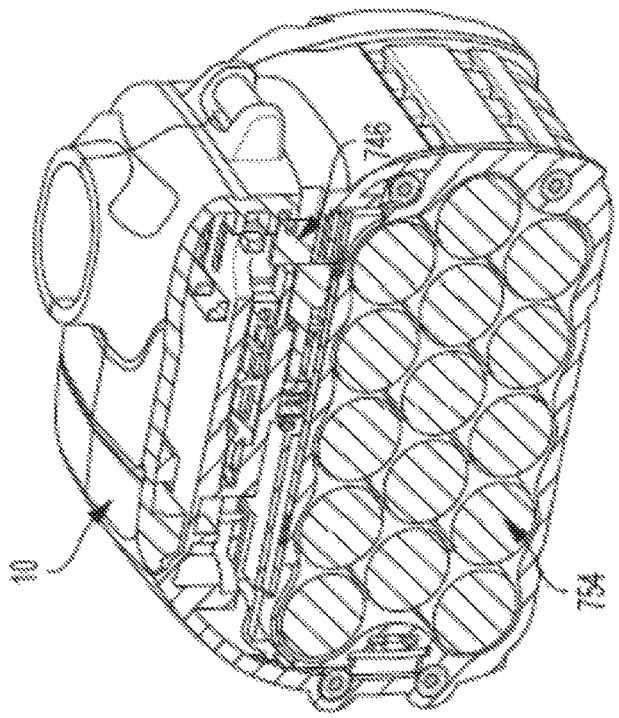
FIGS. 4A and 4B are section views of the exemplary battery pack and tool foot of FIG. 3.
Figure 4B:
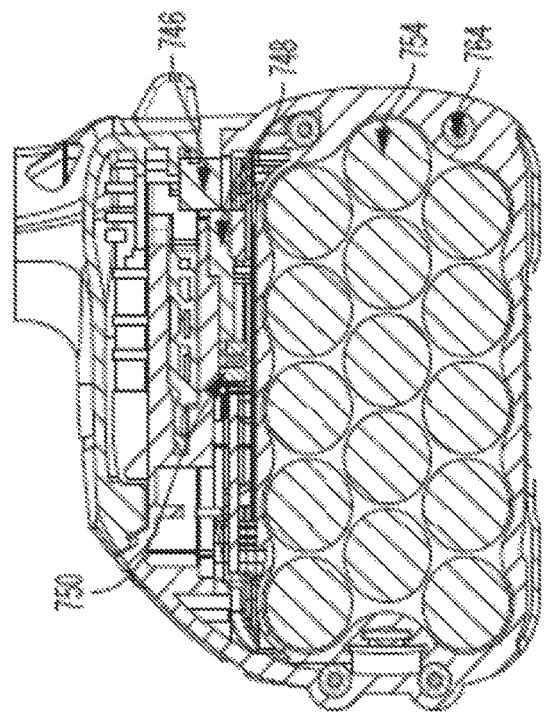

FIG. 1 illustrates another exemplary embodiment of a convertible battery pack 20A4. The convertible battery pack 20A4 includes a housing 712. The convertible battery pack 20A4 may include a variety of alternate configurations for creating the battery pack housing 712 for example, a top portion 714 and a bottom portion 716 coupled together to form the battery pack housing 712 or two side portions 713 coupled with a top portion 715 to form the battery pack housing 712. Regardless of the structure, the battery pack housing 712 will form an interior cavity 718. Other configurations for forming the battery pack housing 712 are contemplated and encompassed by the present disclosure. The battery pack housing 712 includes an electrical device interface 720 for mechanically coupling with a corresponding battery pack interface 722 of an electrical device, for example, a power tool 10 or a battery charger 30. In the illustrated exemplary embodiment, the electrical device interface 720 includes a rail and groove system including a pair of rails 724 and a pair of grooves 726. Other types of interfaces are contemplated and encompassed by the present disclosure. The electrical device interface 720 may also include a latching system 728 for affixing the convertible battery pack 20A4 to the electrical device 10.

The battery pack housing 712 also includes a plurality of slots 730 in the top portion 714 of the battery pack housing 712. The slots 730 may be positioned in other portions of the battery pack housing 712. The plurality of slots 730 forms a set of slots 730. The plurality of slots 730 corresponds to a plurality of battery terminals 732. The plurality of battery terminals 732 forms a set of battery terminals 732. The plurality of slots 730 also corresponds to a plurality of terminals 734 of the electrical device. The plurality of electrical device terminals 734 forms a set of electrical device terminals 734. The electrical device terminals 734 are received by the battery terminal slots 730 and engage and mate with the battery terminals 732, as will be discussed in more detail below.

Conventional battery packs and electrical devices include power terminals and signal terminals. The power terminals transfer power level voltage and current between the battery pack and the electrical device. These levels may range from about 9V to about 240V and 100 mA to 200 A, depending upon the device and the application. These terminals are typically referred to as the B+ and B− terminals. In addition, these terminals are typically of a higher conductivity grade material to handle the power (W) requirements associated with the aforementioned voltage and current levels. The signal terminals transfer signal level voltage and current between the battery pack and the electrical device. These levels are typically in the range of 0V to 30V and 0 A to 10 mA, depending upon the device and the application. These terminals may be of a lower conductivity grade material as they do not require handling high power (W) levels.

In this embodiment of the present invention, the battery pack housing 712 also includes a pair of conversion slots or raceways 736 extending along the top portion 714 of the battery pack housing 712 on opposing sides of the battery terminal slots 730. In the illustrated exemplary embodiment, the raceways 736 extend from a forward (in the orientation illustrated in FIG. 1) edge or surface 738 of the battery pack housing 712 to a central portion 740 of the top portion 714 of the battery pack housing 712. Each raceway 736 ends at a through hole 742 in the top portion 714 of the battery pack housing 712. The through holes 742 extend from an exterior surface of the battery pack housing 712 to the interior cavity 718. In the illustrated embodiment, the through holes 742 are positioned in front of the rails 724 of the power tool interface and adjacent to the battery pack housing slots 730. The conversion slots 730 and through holes 742 may be positioned in other portions of the battery pack housing 712. Alternate embodiments may include more or less conversion slots 730.

FIGS. 2A, 2B, 3, 4A and 4B illustrate an exemplary battery pack interface 722, in this instance that of a power tool 10, that mates with the convertible battery pack 20A4. The battery pack interface 722 includes a pair of rails and grooves that mechanically mate with the power tool interface, described above. The battery pack interface 722 also includes an electrical device terminal block 723. The electrical device terminal block 723 holds the electrical device terminals 734. The battery pack interface 722 also includes a pair of conversion elements or projections 746. Alternate exemplary embodiments of the electrical device may include more or less conversion elements 746 and are contemplated and encompassed by the present disclosure. In the exemplary embodiment, the conversion elements 746 may be simple projections or protrusions that may extend down from the battery pack interface 722. The conversion elements 746 are sized and positioned to be received in corresponding battery pack conversion slots 730. The convertible battery pack 20A4 includes a converter element 750. The converter element includes a pair of converter element projections 748 extending from the converter element 750. As the battery pack interface 722 slides into mating engagement with the electrical device interface 720 in a mating direction—as indicated by arrow A—the conversion elements 746 are received in and slide along corresponding conversion slots 730. At a certain point in the mating process, as described in more detail below, the conversion projections 746 will engage the converter element projections 748. As the mating process continues in the mating direction, the conversion elements 746 will force the converter element projections 748, and consequently the entire converter element 750, to move or slide in the mating direction.

Figure 5:
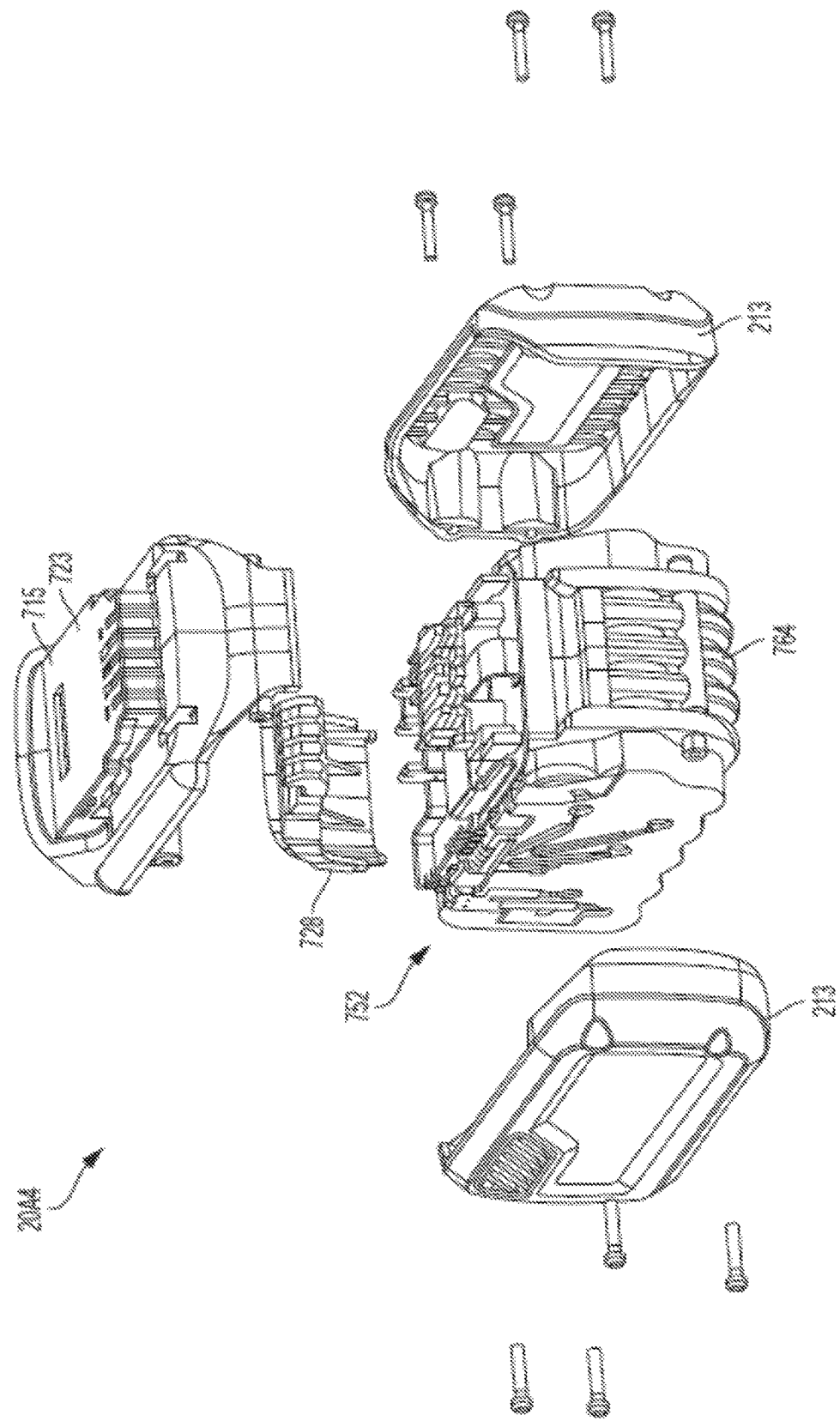
FIG. 5 is an exploded view of the exemplary convertible battery pack of FIG. 1.
Figure 6:
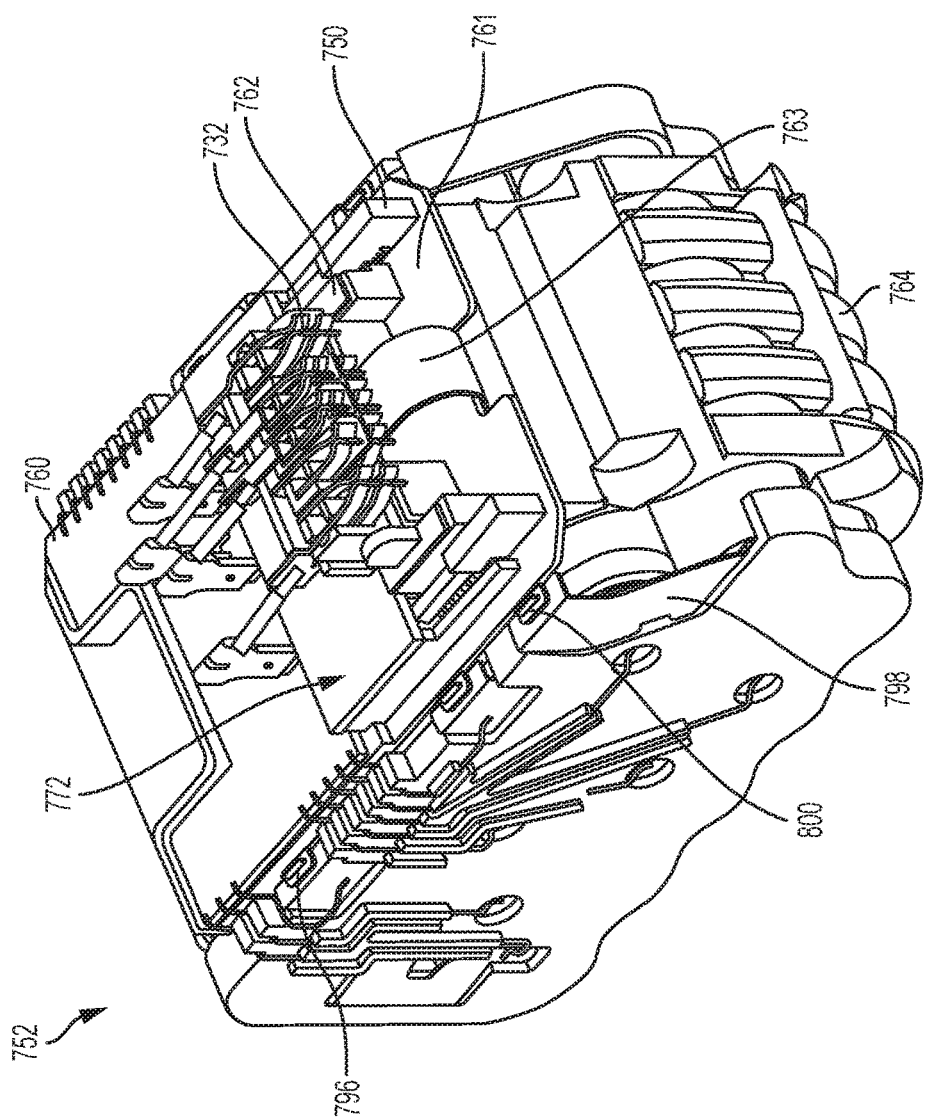
FIG. 6 is a view of an exemplary embodiment of a battery core pack of the exemplary convertible battery pack of FIG. 1.
Figure 7:
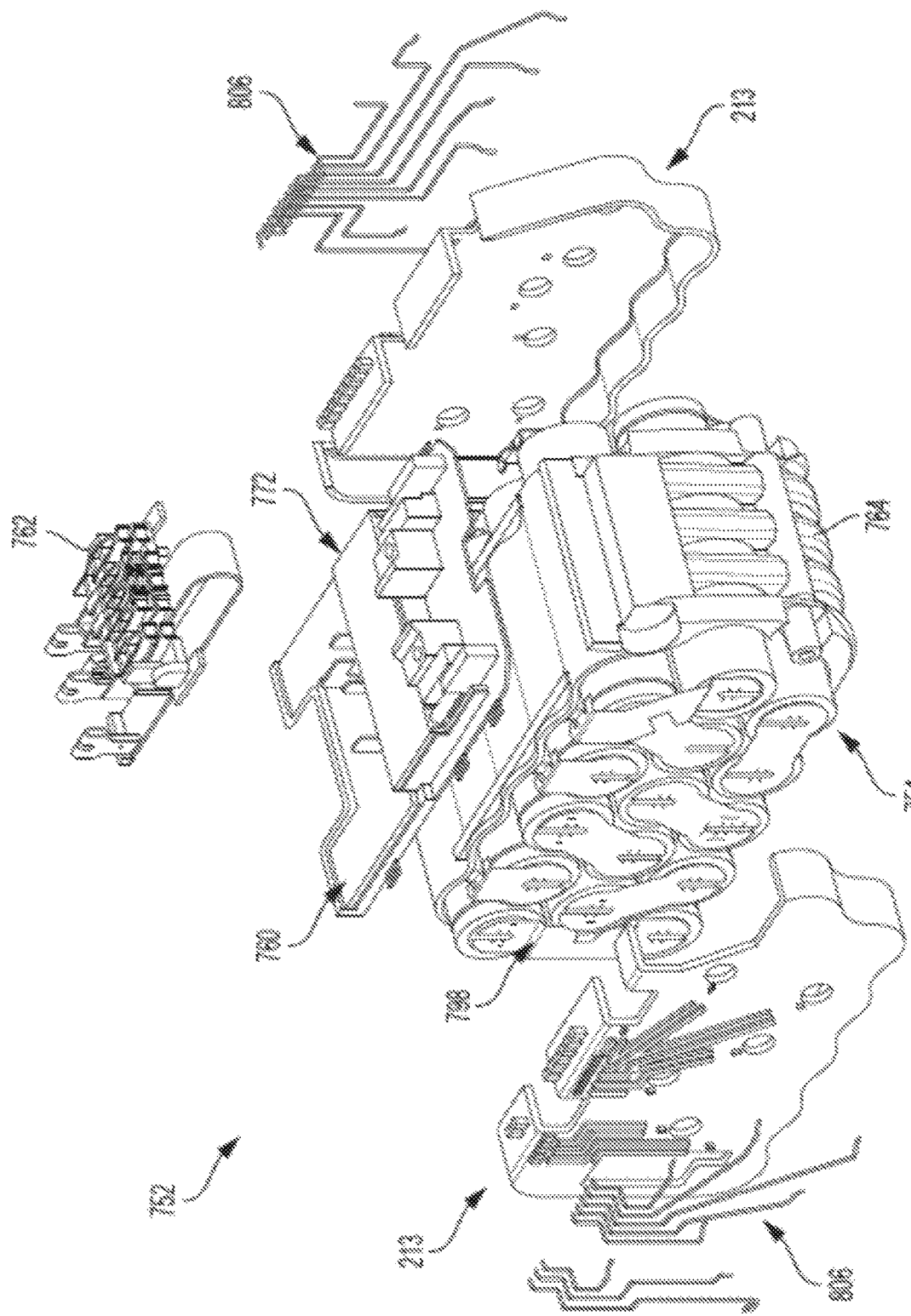
FIG. 7 is an exploded view of the exemplary battery core pack of FIG. 6.

As illustrated in FIGS. 5-7, the exemplary embodiment of the battery 752 includes the plurality of battery cells 754. The battery 752 also includes a plurality of cell interconnects 756, such as straps or wires, electrically connecting a cell terminal 758 of one cell to a cell terminal 758 of another cell and/or providing an electrical coupler for connecting a terminal of a cell to a main printed circuit board (PCB) 760 or to a flexible printed circuit which in turn connects to a PCB or to some other type of support board 761 housing electrical connections. Also illustrated is the latch system for coupling to the electrical device(s). The battery 752 also includes a terminal block 762 and the battery terminals 732. At one end, the battery terminals 732 are configured to electrically couple to the electrical device terminals 734 and at another end the battery terminals 732 are electrically coupled to the battery cells 754, as described in more detail below, in part by a connector such as a ribbon cable 763.

Figure 9:
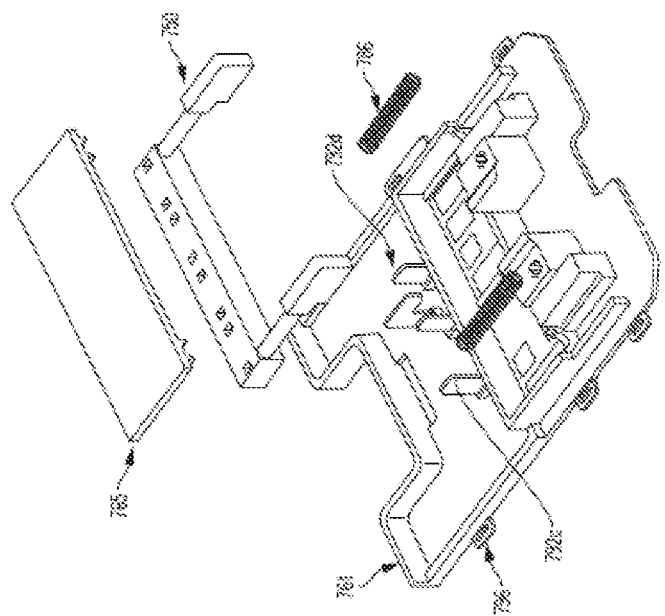
FIG. 9 is an exploded view of the converting subsystem of the exemplary battery of FIG. 6.

The converter element 750 includes a support structure, board or housing 774. The support structure 774 may be of a plastic material or any other material that will serve the functions described below. In the illustrated exemplary embodiment the converter element support structure is in the shape of a U. More specifically, the converter element support structure includes two parallel legs 776 and a crossbar 778 connecting the parallel legs 776. The converter element 750 may take other shapes. The converter element 750 includes a pair of projections 780. The converter element projections 748 extend from a top surface 782 of the converter element support structure. One of the projections may extend from a surface of each of the parallel legs 776. The converter element 750 may include more or less projections. Each projection extends through one of the through holes 742 and into the associated raceway 736. When the converter element 750 is in a first position, as illustrated in FIG. 9A and described below, the projections are positioned at a first end of the corresponding through hole. When the converter element 750 is in a second position, as illustrated in FIG. 9B and described below, the projections are positioned at a second end of the corresponding through hole.

The converter element 750 also includes a plurality of switching contacts (SC) 784. The plurality of switching contacts 784 forms a set of switching contacts 784. In the illustrated exemplary embodiment of the converter element 750, the set of contacts is power contacts in that they will transfer relatively high power currents. The support structure also includes a bottom surface. The set of power contacts extend from the bottom surface of the cross bar.

Figure 8A:
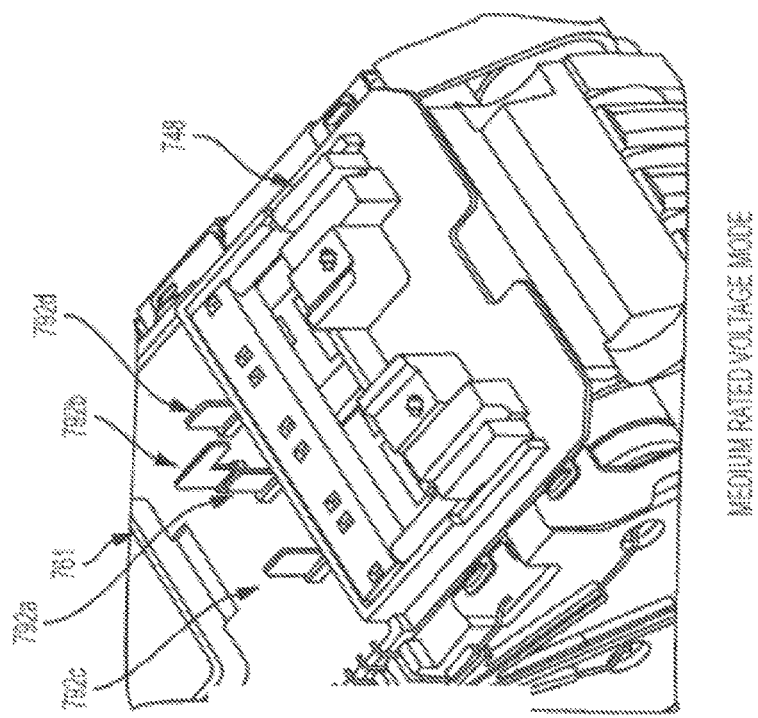
FIGS. 8A and 8B are detail views of the converting mechanism of the exemplary battery core pack of FIG. 6 in the low rated voltage configuration and the medium rated voltage configuration, respectively.
Figure 8B:
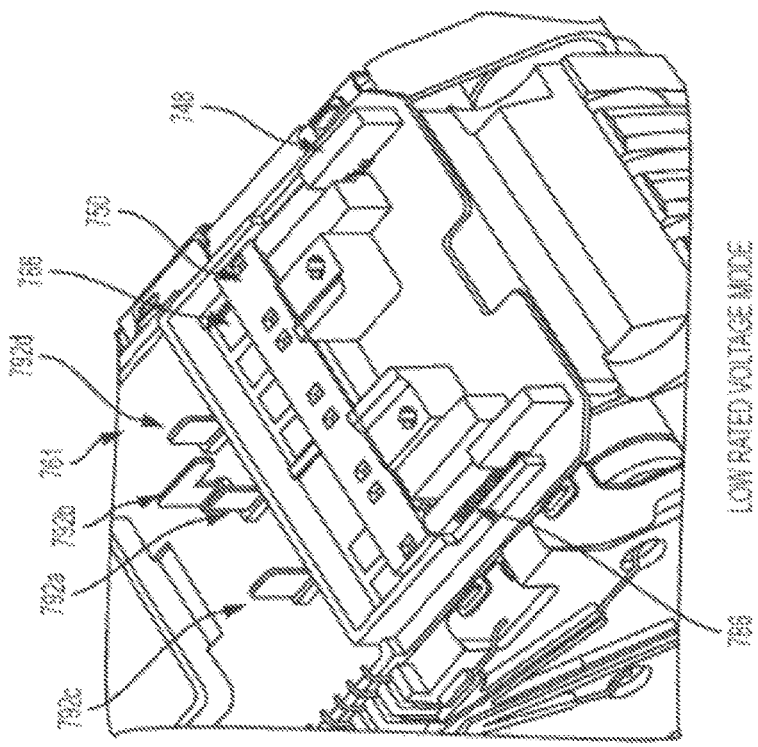

The converting subsystem 772 also includes a pair of compression springs 786. Alternate exemplary embodiments may include more or less springs 786, other types of springs and/or springs positioned in different locations and are contemplated and encompassed by the present disclosure. Each parallel leg includes a spring connection projection 788. A first end of each compression spring is attached to a corresponding spring connection projection 788. A second end of each compression spring is coupled to the support board. The compression springs 786 are configured to force the converter element 750 into the first position, as illustrated in FIG. 8A. As the electrical device 10 mates with the convertible battery pack 20A4 in the mating direction and the electrical device conversion elements 746 engage the converter element projections 748, the converter element 750 is moved from its first position (illustrated in FIGS. 8A and 8B) and forced to act against the springs 786 thereby compressing the springs 786. When the electrical device 10 is fully mated with the convertible battery pack 20A4, the converter element 750 will have moved from the first position to the second position and the springs 786 will be at their full compression (illustrated in FIG. 8B). When the electrical device 10 is detached from the convertible battery pack 20A4, the springs 786 force the converter element 750 to move from the second position (illustrated in FIG. 8B) to the first position (illustrated in FIG. 8A). The battery 752 may also include, for example, the PCB 760 and/or some other type of insulating support board between the conversion subsystem and the cells and/or adjacent to the conversion subsystem, as described in more detail below.

FIGS. 11B and 11D illustrate the second—or underside—of the converter element 750. FIG. 11C illustrates a side view of the converter element 750 and FIG. 11A illustrates a top, isometric view of the converter element 750.

FIG. 10 illustrates the support board 761 and the plurality of contact pads 766. The plurality of contact pads 766 forms a set of contact pads 766. The plurality of contact pads 766 are electrically conductive elements. Each of the plurality of contact pads 766 is electrically connectable to a specific terminal of a particular battery cell string by the power traces 790—embedded in the support board 761 material and described in more detail below—and the cell couplers. The support board 761 is placed on the cell holder 764 such that each power trace coupler 796 is aligned with and couples to a corresponding battery strap coupler 800. The power trace coupler 796 is connected to the battery strap coupler 800 by welding or some other connection technique. FIG. 10 also clearly illustrates the exemplary contact pad layout. Each of the contact pads 766 of the first set of contact pads 766 (A+, B+, C+, A−, B−, C−) is electrically coupled to a denoted cell string terminal, specifically the A+ contact pad 766 is electrically coupled to the A+ terminal of the A string of cells, the B+ contact pad 766 is electrically coupled to the B+ terminal of the B string of cells, the C+ contact pads 766 are electrically coupled to the C+ terminal of the C string of cells, the A− contact pad 766 is electrically coupled to the A− terminal of the A string of cells, the B− contact pad 766 is electrically coupled to the B− terminal of the B string of cells and the C− contact pad 766 is electrically coupled to the C− terminal of the C string of cells.

Furthermore, additionally referring to FIG. 6, the A+ contact pad 766 is electrically coupled to the BATT+ battery terminal via the BATT+/A+ flag and the associated power trace and the C− contact pad 766 is electrically coupled to the BATT− battery terminal via the BATT−/C− flag and the associated power trace. Each contact pad 766 of a second set of contact pads 766 (BT1, BT3) is electrically coupled via the associated power trace to a denoted battery terminal flag, and as illustrated in FIG. 7, each battery terminal flag is electrically coupled to a corresponding battery terminal—BT1 flag is coupled to battery terminal BT1 and BT3 flag is coupled to battery terminal BT3. As such, the BT1 contact pad 766 is electrically coupled to the BT1 battery terminal and the BT3 contact pad 766 is electrically coupled to the BT3 battery terminal.

In the exemplary embodiment, the plurality of contact pads 766 allow for the converter element switching contacts 784 to slide along the support board 761 and the switching contacts 784 to break and make connections between the discrete contact pads 766—effectively opening and closing the power switches SW1-SW7.

While subject to tool vibration, the moving electrical contact 784 needs to maintain surface contact with the stationary contact pads 766 in order to prevent wear, electrical erosion, and subsequent failure.

FIG. 12 illustrates a traditional moving contact. In this example, the contact takes the shape of a leaf spring. Leaf springs tend to suffer from spring force variation, resonance, and mechanical chatter when subjected to certain vibration frequencies. Effectively dampening the system is very difficult as the point of contact is typically far away from the fulcrum.

Figure 13:
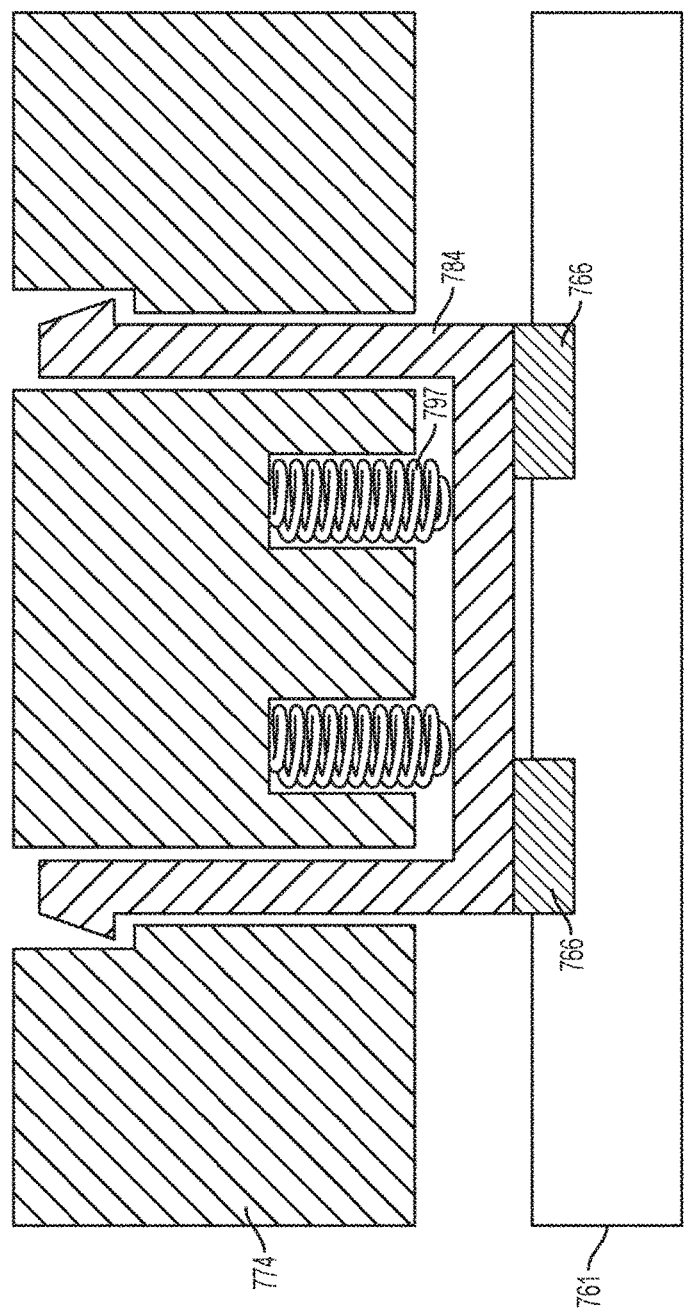
FIG. 13 is an elevation view of a staple and spring contact of the present disclosure.

FIG. 13 illustrates a cross section of the present invention in which the U shaped moving contact 784 is spring loaded and utilizes barbs 800 on the upper left and right corners to hold the moving contact 784 locked in the carrier 774. The direction of movement of the carrier 774 is into and out of the paper.

The leading and trailing edges of the moving contact 784 would also contain a lead-in chamfer or radius to prevent the moving contact from "tripping" on the stationary contact pad 766. The direction of movement of the contact 784 (direction of bidirectional arrow A) would be nominally orthogonal to the direction of movement of the carrier 774 (into and out of the page) but could be at some given angle to allow for smoother travel and transition between contact pads 766. A pair of springs 797 would apply constant pressure between the moving contact 784 and the stationary contact pads 766. The configuration of the springs 797 and a clearance of the uprights 802 and the barb 804 relative to a shoulder 806 of the carrier 774 can accommodate the contact 784 moving over the contact pad 766 and variations in the height of the contact pad 766 by allowing the contact 784 to rise up and down or to pivot up to the left or up to the right in the carrier 774 if the contact pad 766 is not perfectly flat.

If the tool and battery vibrate, the convention moving contact illustrated in FIG. 12 and the stationary contact pads 766 could separate. This could result in an arc. The arc erodes the contact plating and base material which could lead to an electrically open or high resistance connection. It is very preferable that there is adequate surface contact between the contact 797 and the contact pad 766 to prevent electrical wear.

The present invention illustrated in FIG. 13 enables the contact 797 to adjust to vibration or changes in the surface of the contact pad 766 to prevent separation between the contact pad 766 and the contact 797 and hence prevent arcing.

The U shaped moving contact with embedded springs results in a stable force applied between the mating contacts. The barbs on the end of the moving contact 784 serve as a manufacturing aid to keep the moving contacts 784 and the carrier 774 joined as one assembly. The barb also prevent the moving contact 784 from inadvertently being dislodged if an edge is caught when moving across stationary contact pads 766.

Figure 14:
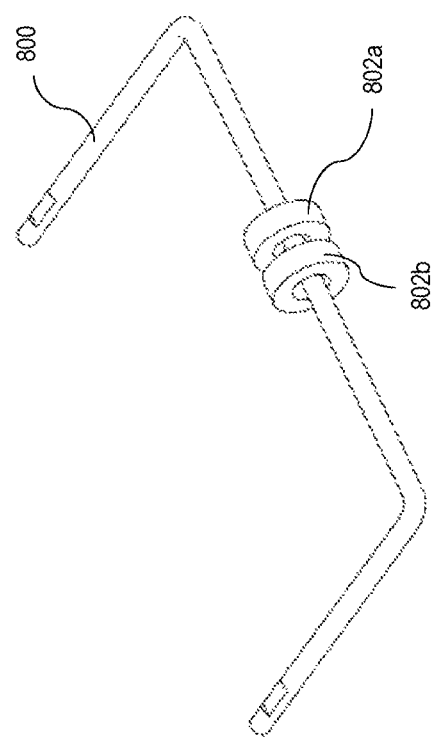
FIG. 14 is a perspective view of a first step of a manufacturing process of an exemplary embodiment of a converter element of the battery pack of FIG. 1.

Referring to FIGS. 9, and 11A-11E, there is illustrated an exemplary converter element 750. The converter element 750 is part of the switching circuit to convert the battery cells from a parallel configuration to a series configuration and back to a parallel configuration, as described above. FIGS. 14-17 illustrate an alternate exemplary embodiment of the converter element 750 which presents an improved converter element 750 and an improved method for manufacturing the converter element 750. As illustrated in FIG. 14, a U-shaped pin 800 is formed. The pin 800 is preferably made of a metal. A pair of gaskets 802a, 802b are placed on the metal pin 800. The gaskets 802a, 802b are made of a soft rubber, or other pliable material.

Figure 15:
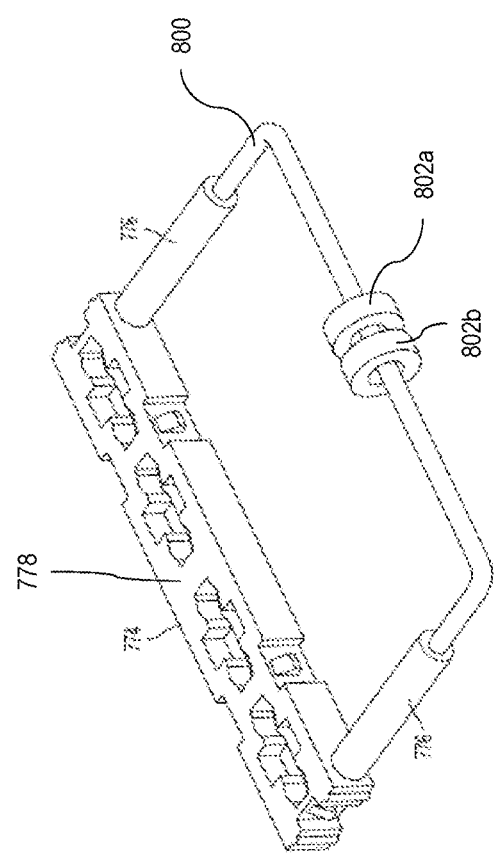
FIG. 15 is a perspective view of a second step of a manufacturing process of an exemplary embodiment of a converter element of the battery pack of FIG. 1.
Figure 16:
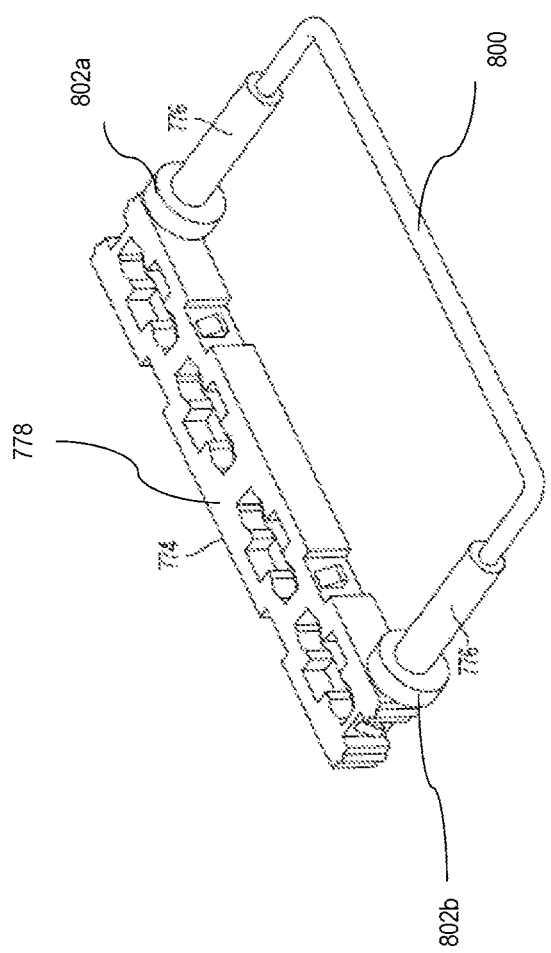
FIG. 16 is a perspective view of a third step of a manufacturing process of an exemplary embodiment of a converter element of the battery pack of FIG. 1.
Figure 17:
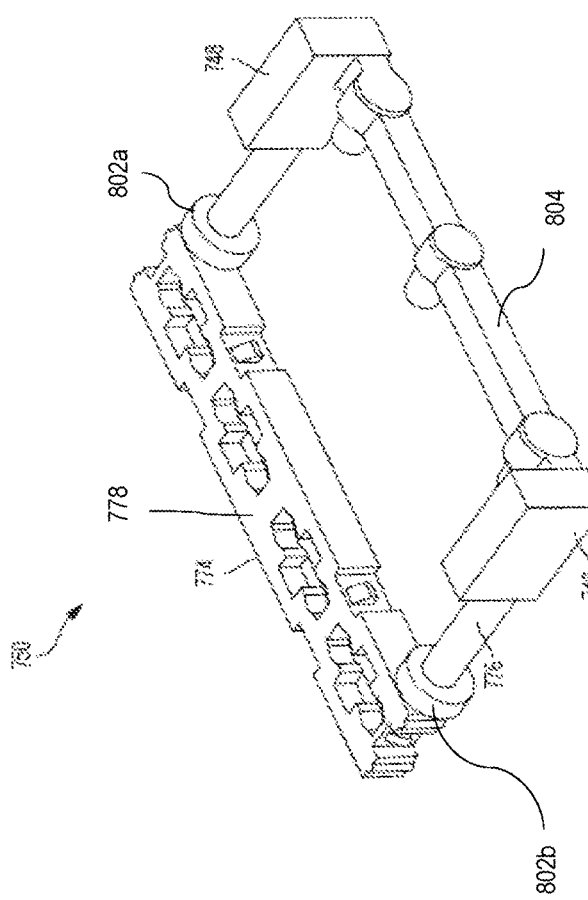
FIG. 17 is a perspective view of a fourth step of a manufacturing process of an exemplary embodiment of a converter element of the battery pack of FIG. 1.

As illustrated in FIGS. 15-17, the carrier 774 is insert molded in a multi-step process. As illustrated in FIG. 15, in a first step, the parallel legs 776 and the crossbar 778 are insert molded onto the U-shaped pin 800. The crossbar 778 and the parallel legs 776 are made of a plastic, as described above.

As illustrated in FIG. 16, in a second step, the gaskets 802a, 802b are moved onto respective parallel legs 776 towards the crossbar 778. The gaskets 802a, 802b may be moved to abutment with the crossbar 778.

As illustrated in FIG. 17, in a third step, the converter element projections 748 and a support bar 804 are insert molded over onto the remaining portion of the U-shaped pin 800 to finally form the converter element 50. Distinct from the converter element 750 illustrated in FIG. 11A, the embodiment of the converter element 750 of FIG. 17 includes the support bar 804.

This method provides enables the gaskets 802a, 802b to more easily be placed on the parallel legs 776.

Numerous modifications may be made to the exemplary implementations described above. These and other implementations are within the scope of this application.

The invention claimed is:

1. A battery pack comprising:
   a support board having a planar surface;
   a plurality of contact pads arranged in a predefined configuration in the support board, each of the plurality of contact pads having an exposed planar surface generally parallel to the support board planar surface; and
   a converter element including a housing having a first side facing the support board planar surface, at least one contact held in the housing, the at least one contact having a mating surface and extending towards the support board planar surface, and at least one spring held in the housing positioned between the housing and the at least one contact forcing the at least one contact towards the planar surface and the plurality of contact pads.

2. The battery pack, as recited in claim 1, further comprising a pair of springs associated with each at least one contact, each pair of springs held in the housing and positioned between the housing and the associated at least one contact.

3. The battery pack, as recited in claim 2, wherein the pair of springs are space apart in a direction parallel to the support board surface and positioned relative to the associated at least one contact to allow the at least one contact to pivot about an axis parallel to the planar surface.

4. The battery pack, as recited in claim 2, wherein the at least one contact mating surface has a width and the pair of associated springs are positioned in the housing relative to the width such that a first of the pair of springs forces a first end of the width into a first contact pad and a second of the pair of springs forces a second end of the width into a second contact pad.

* * * * *